(12) United States Patent
Merrill et al.

(10) Patent No.: US 7,811,620 B2
(45) Date of Patent: Oct. 12, 2010

(54) METHOD OF MAKING WHEY PROTEIN COMPOUNDS

(75) Inventors: Richard K. Merrill, Highlands Ranch, CO (US); Madison V. Blanton, Littleton, CO (US); Frank Jaskulka, Lakewood, CO (US); Mayank Singh, Aurora, CO (US)

(73) Assignee: Leprino Foods Company, Denver, CO (US)

( * ) Notice: Subject to any disclaimer, the term of this patent is extended or adjusted under 35 U.S.C. 154(b) by 1217 days.

(21) Appl. No.: 11/375,437

(22) Filed: Mar. 13, 2006

(65) Prior Publication Data

US 2006/0204643 A1 Sep. 14, 2006

Related U.S. Application Data

(60) Provisional application No. 60/661,859, filed on Mar. 14, 2005.

(51) Int. Cl.
*A23J 1/00* (2006.01)
(52) U.S. Cl. .................. 426/656; 426/660; 426/658; 426/583
(58) Field of Classification Search .................. 426/656, 426/660, 658, 657, 583
See application file for complete search history.

(56) References Cited

U.S. PATENT DOCUMENTS

| | | | | |
|---|---|---|---|---|
| 4,112,123 A | * | 9/1978 | Roberts | 426/72 |
| 4,325,978 A | * | 4/1982 | Remer | 426/534 |
| 4,668,519 A | * | 5/1987 | Dartey et al. | 426/548 |
| 4,734,287 A | * | 3/1988 | Singer et al. | 426/41 |
| 5,188,842 A | | 2/1993 | Visser et al. | |
| 5,217,741 A | | 6/1993 | Kawachi et al. | |
| 5,494,696 A | | 2/1996 | Holst et al. | |
| 5,714,182 A | * | 2/1998 | Bisson et al. | 426/34 |
| 5,902,625 A | | 5/1999 | Barz et al. | |
| 5,902,630 A | | 5/1999 | Imai et al. | |
| 5,922,388 A | | 7/1999 | Garwood et al. | |
| 6,051,268 A | * | 4/2000 | Mahmoud et al. | 426/580 |
| 6,451,371 B1 | * | 9/2002 | Foegeding et al. | 426/656 |
| 6,495,194 B2 | | 12/2002 | Sato et al. | |
| 6,599,556 B2 | | 7/2003 | Stark et al. | |
| 6,767,575 B1 | | 7/2004 | Huss et al. | |
| 7,407,683 B2 | * | 8/2008 | Jones | 426/660 |
| 2005/0084579 A1 | * | 4/2005 | Onwulata | 426/516 |

FOREIGN PATENT DOCUMENTS

WO WO 2004057971 * 7/2004

* cited by examiner

*Primary Examiner*—Anthony Weier
(74) *Attorney, Agent, or Firm*—Townsend and Townsend and Crew LLP

(57) ABSTRACT

A method of making a powdered whey protein, where the method includes heating a slurry comprising starting whey protein to a temperature of about 140° F. to about 300° F. The heating converts at least a portion of the starting whey protein to denatured whey protein. The method also includes subjecting the slurry to high shear conditions, and drying the slurry to leave the powdered whey protein. Also, a system for producing a powdered whey protein. The system includes a cooker to heat a slurry comprising starting whey protein, and a shear pump to subject the slurry to high shear conditions.

19 Claims, 4 Drawing Sheets

METHOD OF MAKING WHEY PROTEIN COMPOUNDS

CROSS-REFERENCES TO RELATED APPLICATIONS

This application claims priority to U.S. Provisional App. No. 60/661,859, filed Mar. 14, 2005, and titled "Whey Protein Compounds and Methods of Making", the entire contents of which are herein incorporated by reference for all purposes.

BACKGROUND OF THE INVENTION

As diabetes and obesity become increasingly serious problems for large segments of the population, there is increased interest in the development of food substitutes for the fats and processed sugars added to many foods. There is particular interest in finding safer and more nutritious ingredients for confectioneries such as chocolates, and caramel, and meal replacement products (e.g., protein bars) which do not degrade the organoleptic qualities of foods.

One ingredient that has been studied as a substitute for a portion of the carbohydrates in confectionaries is whey protein. Whey protein has been used as a binder, extender, water retention agent, emulsifier, foaming agent, and gelling agent, among other uses. Generally, native, non-denatured whey protein is denatured by heat to create mutual hydrophobic interactions between protein molecules, and SH/SS exchange reactions between non-covalent bonds, such as ionic bonds and hydrogen bonds. These and other aspects of the denaturization process create a gel-like consistency that may be used as a substitute for fats and carbohydrates in foods.

The process of denaturing whey proteins needs to be carefully conducted for the gel-like product to have good organoleptic qualities. Oftentimes, the denatured whey protein partially coagulates into particles with mean particle sizes between 25 and 200 μm. The particles can impart a sandy, gritty taste sensation that make the ingredient undesirable as a food substitute in ice cream and confectionaries.

Food makers have attempted to reduce the mean size of the particles in the denatured whey protein by adding back native whey protein, and salts, among other additives. Unfortunately, several of these additives have an adverse impact on the hydrophobic qualities of the denatured protein, and increase the tendency of the protein to attract and retain water. This tends to give foodstuffs made with the whey protein a chalky taste as the hydrophilic protein draws in moisture from the surrounding environment. Thus, there remains a need for producing a denatured whey protein that is more hydrophobic in nature that imparts a smooth, creamy texture.

One approach to making these hydrophobic, denatured whey proteins is to heat the native protein at high temperature and/or for longer periods of time. Unfortunately, this approach can quickly clog and foul the heating unit with coagulated whey when the starting slurry is too concentrated in native whey protein. To remedy this problem, the whey protein is diluted with more water before heating to prevent excessive coagulation by the denatured protein. However, this adds significant cost when the water is evaporated to form a powdered food ingredient. Thus, there is a need for systems and methods of making denatured whey proteins that do not foul the production equipment, but also do not require starting with an excessively dilute native whey protein slurry. These and other problems are addressed by embodiments of the present invention.

BRIEF SUMMARY OF THE INVENTION

Embodiments of the invention include a method of making a powdered whey protein. The method may include heating a slurry comprising starting whey protein to a temperature of about 140° F. to about 300° F., where the heating converts at least a portion of the starting whey protein to denatured whey protein. The method may further include subjecting the slurry to high shear conditions, and drying the slurry to leave the powdered whey protein.

Embodiments of the invention may also include a system for producing a powdered whey protein. The system may include a cooker to heat a slurry comprising starting whey protein, where the heating converts at least a portion of the starting whey protein to denatured whey protein. The system may also include a shear pump to subject the slurry to high shear conditions.

Embodiments of the invention may further include a method of making protein enhanced caramel or nutrition bars. The method may include heating a whey protein slurry to about 140° F. to about 300° F., and subjecting the slurry to high shear conditions, where the heating converts at least a portion of starting whey protein to a denatured whey protein. The method may also include drying the slurry to form a whey protein powder, and adding the whey protein powder to other ingredients such as butter, sugar, and condensed milk to form the protein enhanced caramel.

Additional embodiments and features are set forth in part in the description that follows, and will become apparent to those skilled in the art upon examination of the specification or may be learned by the practice of the invention. The features and advantages of the invention may be realized and attained by means of the instrumentalities, combinations, and methods described in the specification.

DETAILED DESCRIPTION OF THE INVENTION

Whey protein compositions with excellent organoleptic qualities are a food ingredient of choice to replace, at least in part, fats and carbohydrates in confectioneries and other foods. These compositions can turn foods that are high in sugars and saturated fats into highly nutritious, high protein foods having significantly lower amounts of sugars and fats. Native whey proteins, for example whey proteins separated from dairy milk following a cheesemaking process, do not have the consistency, mouthfeel, and low water absorption characteristics of an ideal food ingredient to be used in nutrition bars and other confectionary products. Thus, the native whey protein is denatured by, for example, heating at temperatures of about 140° F. to about 300° F., to produce more hydrophobic compositions with lower water absorption properties and smoother, thicker consistencies that have desirable organoleptic qualities as a food ingredient.

As noted above, the denaturization of whey proteins is challenging because the denatured proteins tend to gel and coagulate during heating. This causes the denatured proteins to foul heating and pumping equipment used to make the proteins. In response, processors have heated the native whey proteins at lower temperatures, and for shorter periods of time, to denature less of the protein (i.e., partially denatured whey protein). They have also diluted the protein in larger volumes of aqueous slurry to minimize the effects of coagulation and clumping.

It has been discovered, however, that native whey proteins can be effectively denatured by a combination of heating and mixing, and also subjecting the denatured whey protein compositions to high shear conditions. This allows the starting native whey protein composition to be more concentrated (e.g., total dry matter content of about 20% or more, and a whey protein content of about 34% or more, by weight, relative to the total dry matter). It also produces whey protein compositions with substantially fewer coagulants, which give the compositions superior organoleptic qualities. An outline of a method of producing a powdered whey protein according to embodiments of the invention will now be described.

Methods for Preparing Whey Protein Powders

Figure 1:
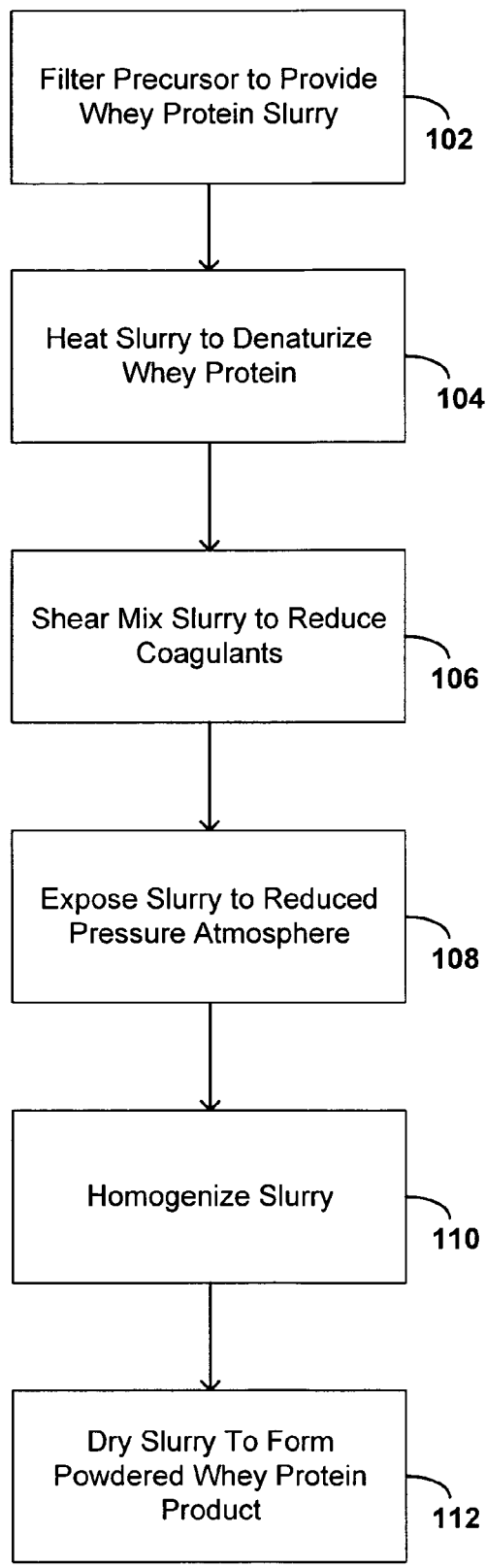
FIG. 1 shows a flowchart outline of a method of making a whey protein powder according to embodiments of the invention.

FIG. 1 shows a flowchart outline of a method 100 of making a whey protein powder according to embodiments of the invention. The method 100 includes providing a slurry that includes water and native whey protein 102. The slurry may include about 20%, by weight, or more total solids, and about 34%, by weight, or more whey protein relative to the total solids. The slurry may be provided by filtering or otherwise concentrating a precursor material. For example, the whey slurry may be derived from the separation and filtering of a whey mixture obtained from a cheesemaking process. Additional details of the separation and filtering processes, as they relate to cheesemaking, can be found in U.S. Provisional Patent App. No. 60/568,029 to Merrill et al., filed May 3, 2004, and titled "SOFT OR FIRM/SEMI-HARD RIPENED OR UNRIPENED CHEESE AND METHODS OF MAKING SUCH CHEESES", the entire contents of which are herein incorporated by reference for all purposes.

Once the slurry has been provided, it may be heated to denature the whey protein 104. The slurry may be heated to a temperature of about 140° F. to about 300° F. (e.g., about 160° F. to about 210° F., about 195° F., etc.). Concurrent with the heating, the slurry may be mixed or agitated to reduce the level of coagulation and clumping of the denaturing whey proteins. The slurry may be mixed and heated for about 10 to about 60 seconds (e.g., about 20 seconds).

During or after heating, the slurry is subjected to high shear conditions 106, which reduces the coagulants that may have formed as the whey protein denatures. High shear conditions as used herein generally refer to conditions in which 10,000 to 500,000 $s^{-1}$ of shear is applied. In some methods, the slurry is typically sheared by a high-shear mixer or colloid mill, at a temperature of about 90 to 300° F. for about 0.01 to 0.5 seconds.

The slurry may also be exposed to a reduced pressure atmosphere 108 (e.g., run through an evaporator) to remove at least a portion of the volatile sulfur containing compounds that may have been formed from denaturing the whey protein. The slurry may also be cooled, and water vapor removed, during the exposure to the reduced pressure atmosphere.

The slurry may also be homogenized 110 to give the slurry a uniform consistency and concentration throughout. Homogenization of the slurry, if performed, generally involves the process of reducing the particle size of fluid products under conditions of extreme pressure, shear, turbulence, acceleration and impact, to make them more stable and have a better texture. The effect is typically achieved by forcing the slurry through a special homogenizing valve at a very high pressure. Homogenization can be done in one or multiple steps. For most methods, two steps are sufficient. It is common that the main homogenization takes place in the first homogenization valve and a mild homogenization in the second valve. The second homogenization valve can enhance the product quality. This step, for example, can break down newly formed protein globule clusters formed directly after the first valve due to re-agglomeration. Homogenization is usually conducted at a temperature of about 90-219° F., for about 0.01 to 0.5 second.

The slurry may also be dried to produce the powdered whey protein product 112. Drying processes may include spray drying, heating, and evaporation, among other processes. The dried whey protein powder may then be packaged or added directly to other ingredients for making a foodstuff.

It will be appreciated that the process of making the denatured whey protein can require less than all the steps, and a rearrangement of the steps. Some methods, for example, generally involve mixing a liquid (e.g., water) and native whey protein concentrate to form the slurry. The resulting slurry is then subjected to a process that usually includes cooking the slurry, typically to about 140-300° F. The processing can also include one, two or all of the following processes: (1) subjecting the slurry to high shear conditions, (2) homogenizing the slurry, and/or (3) adjusting the water content of the slurry, usually to about 5-95 percent, or 15-80 percent by weight. As noted above, these processes are helpful in controlling processing parameters and the ultimate organoleptic properties of the final denatured whey product.

Different methods can incorporate different combinations of two or all three of the foregoing optional processes. So, for example, in some methods, the pre-mixing processing involves (1) and (2) but not (3). Other methods include (1) and (3) but not (2). Still other pre-mixing processes include (2) and (3) but not (1). And still other processes include (1), (2) and (3). The other remaining combinations can also be utilized depending upon the particular requirements of an application.

In some methods, some of the steps are optionally carried out at the same time (e.g., subjecting the slurry to high shear conditions while homogenizing the slurry; or heating the slurry while subjecting it to high shear conditions and/or homogenizing the slurry). Cooking can optionally be performed during the shearing and/or homogenizing.

Figure 2:
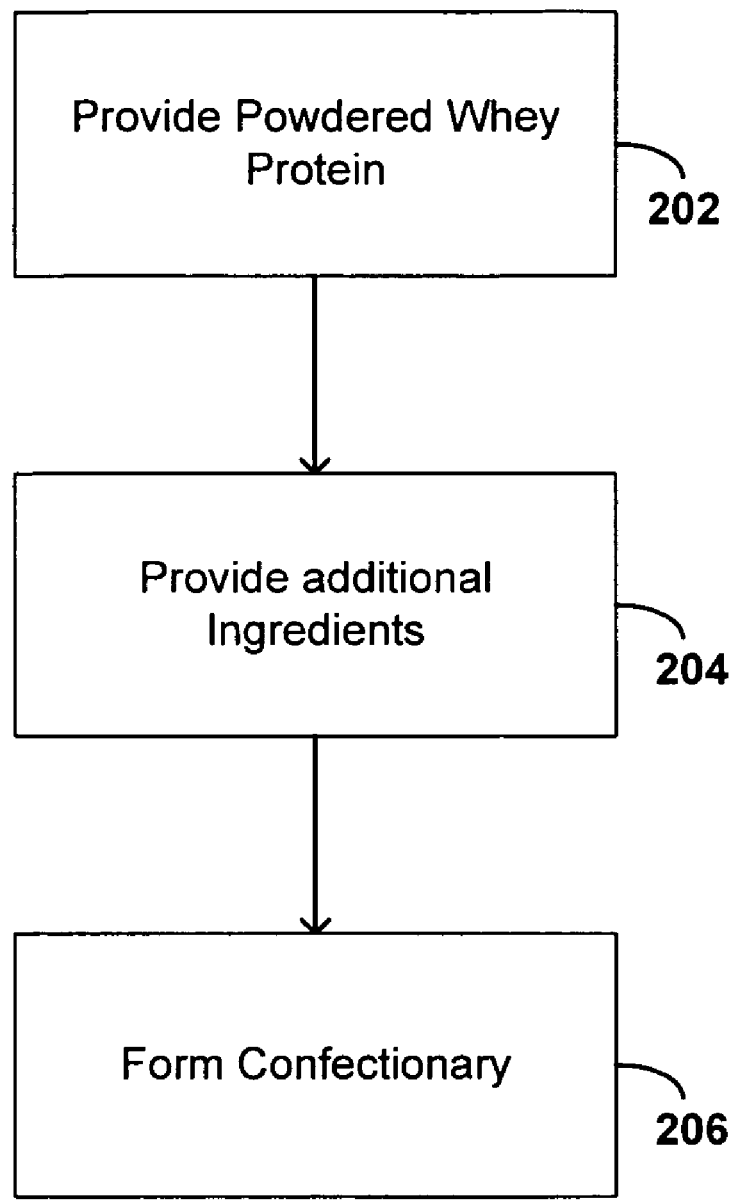
FIG. 2 shows a flowchart outline of a method of making a confectionary with powdered whey protein according to embodiments of the invention.

FIG. 2 shows a flowchart outline of a method 200 of making a confectionary with powdered whey protein according to embodiments of the invention. The method includes providing the powdered whey protein 202, and adding them to additional ingredients 204 of the confectionary. The mixture of ingredients may then be processed into the confectionary 206. An example of method 200 is the making of high protein more nutritious caramel that can be eaten directly, or added to other confectionaries and baked goods, like candy bars, cakes, cookies, ice creams, etc. The powdered whey protein may be added to other ingredients of the caramel, such as butter, sugar, and sweet condensed milk, which are all mixed and homogenized into the caramel. The caramel may then be poured or molded into squares, blocks, drops, or other shapes.

Additional ingredients may also be added to whey protein, and/or the caramel. These may include pH adjusting compounds that acidify or neutralize, as well as sequestrants, such as phosphates, and citrates, among others.

One with skill in the art will recognize that the method outlined in FIG. 2 can be used to make foodstuffs other than confectionaries. The foodstuffs made can broadly illustrate any type of food to which one can substitute at least a portion of an ingredient with whey protein. Examples of suitable types of foods into which the provided whey protein can be added, include, but are not limited to: pastries, candies, salty-crunchy snacks (such as potato chips), confectionaries, candy bars, nutrition bars, protein bars, meal replacement foods, jellies, jams, dressings, ice creams, cheeses, and meats, among other foods.

Systems for Preparing Whey Protein Powders

Figure 3:
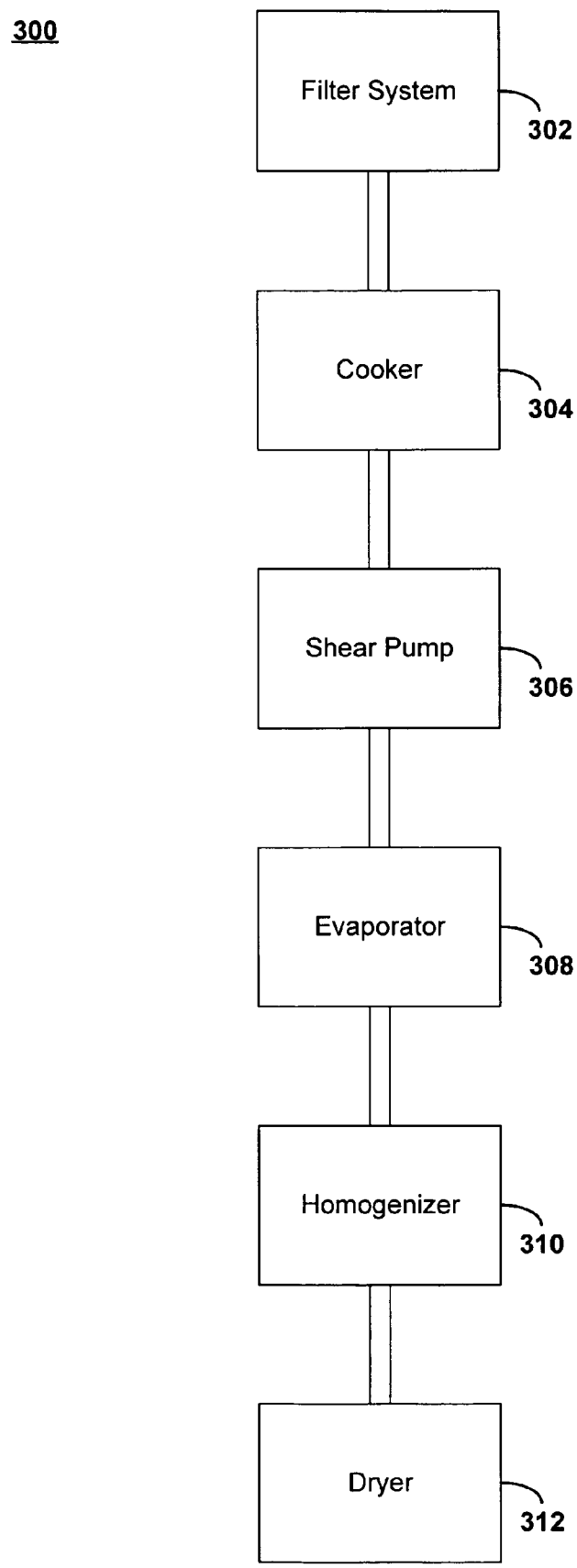
FIG. 3 shows a simplified schematic of a system of making a whey protein powder according to embodiments of the invention.

FIG. 3 depicts one example of a generalized system 300 that can be used to carry out the foregoing methods to prepare denatured whey proteins and whey protein powders that are described herein. The system 300 generally includes the equipment necessary to blend, heat, shear, homogenize and adjust the water content of the slurry to obtain the desired slurry composition. A wide variety of different systems have this general design. Although specific examples of such systems are described below, it should be understood that these systems are only examples and not intended to be exhaustive of the types of systems that can be used to carry out the denatured whey protein processing methods that are described herein or of the type of systems that can be used to prepare the type of denatured whey protein that are disclosed herein.

In system 300, a filter system 302 is used to produce the native whey protein slurry by filtering or otherwise separating the native whey protein solution from other materials, such as cheese curds, lactose, minerals, and water. The filtered slurry may be transferred directly to a cooker 304 via a transfer tube, or may first pass through a mixer or blender (not shown) to further fluidize the original slurry. A liquid (e.g., water) and other slurry ingredients may be mixed into the initial slurry before it is transferred to the cooker 304.

At cooker 304 the initial slurry containing native whey protein is heated to denature at least some of the protein. As noted above, the slurry may be heated to a temperature of about 140° F. to about 300° F., for a period of about 10 to about 60 seconds. The slurry may be mixed during at least a portion of the heating period to reduce, and/or prevent, denatured whey protein from coagulating around the heating elements in cooker 304. One exemplary device for performing this operation is a single or twin-screw mixer or a twin-screw extruder, either fitted for steam injection or having a heated jacket, or a combination of both. When using a twin-screw mixer or extruder to perform the heating and mixing, the screws (i.e., augers) are typically arranged so they overlap, to insure thorough mixing.

The heated slurry may pass through a shear pump 306, where the slurry is subjected to shear conditions. Subjecting the slurry to high shear conditions reduces the denatured whey protein coagulates and other particles that may have formed during heating, and also helps maintain the slurry at a uniform thickness. The shear pump 306 may be connected to cooker 304 via a transfer tube, into evaporator 310. Evaporator 310 exposes the slurry to a reduced pressure atmosphere that suctions away at least a portion of the volatile sulfur containing compounds that may have been formed from denaturing the whey protein (e.g., disulfide bonds formed by cysteine and methionine groups in the protein). Evaporator 310 may also adjust the moisture content within the slurry to a desired range. The slurry may then be transferred to homogenizer 308 by another transfer tube. In homogenizer 308, the slurry, which includes the denatured proteins, is homogenized to give the slurry a uniform consistency and concentration throughout.

The denatured whey protein slurry may then be dried by dryer 312 to form the powdered whey protein product. Dryer 312 may be a spray dryer that aerosolizes the liquid slurry into a warm, dry, low pressure atmosphere where the water component is rapidly volatilized into steam, and separated from the protein and other non-volatile solids. The whey protein powder may then be collected from dryer 312, and packaged or mixed with other food ingredients.

The cooker 304 used to heat the slurry can be of various types, including the lay-down cooker, swept surface heat exchanger, agitated direct heating pipeline cooker. The cookers are capable of heating a slurry of the compositions defined herein to temperatures ranging from about 140-300° F. Specific examples of suitable cookers include the RotaTherm™ cooker available from Gold Peg International Pty. Ltd. (Moorabbin, Vic, Australia) or the FusionCooker™, available from Blentech Corporation, Rohnert Part, Calif.), the continuous mixer from READCO Manufacturing (York, Pa.), or single or Evolum 145 twin screw extruders from Clextral Inc. (Tampa, Fla.). The cookers can heat the slurry by convection (e.g., a heated blanket surrounds the cooker), conduction, or radiation, or by directly injecting steam into the cooker.

Various types of shear pumps can be utilized. Suitable types of shear pumps include inline mixers, or colloid mills. Examples of pumps that can be used include Silverson in-line mixer (East Longmeadow, Mass.) and Stephan cooker (Stephan Machinery Corporation (Columbus, Ohio), or a colloid mill supplied by Waukesha Cherry Burrell (Charlotte, N.C.). The shear pump should be capable of generating a shear rate of at least 10,000 to 500,000 $s^{-1}$.

A number of homogenizers are also suitable for use in the systems that are provided. Examples of homogenizers that can be used include those manufactured by APV Gaulin (Kansas City, Mo.) and Waukesha Cherry Burrell (Charlotte, N.C.). Evaporators of different types can also be utilized. In general, the evaporator should be able to handle relatively viscous solution. Flash vacuum vessels are one example of a suitable evaporator. Evaporators of this type are available from Invensys APV (Lake Mills, Wis.) or De Dietrich Process Systems (Bridgeton, Mo.).

The order in which cooker 304, shear pump 306 and homogenizer 310 appear in FIG. 3 can also be altered in other systems such that all the various permutations are possible. Examples of optional arrangements that can be utilized in other systems include: 1) cooker-homogenizer-shear pump, 2) shear pump-homogenizer-cooker, 3) shear pump-cooker-homogenizer, 4) homogenizer-shear pump-cooker, 5) homogenizer-cooker-shear pump, and the other various permutations.

It will also be appreciated by those of ordinary skill in the art that certain units within system 300 (e.g., shear pump 306, homogenizer 308 and evaporator 310, dryer 312) need not be included. Most slurry preparation systems include a cooker to denature the whey protein. But the slurry preparation system may include none of the other units just listed (i.e., filter system, shear pump, homogenizer, and evaporator), individual units, combinations of multiple units or all the units depending upon the particular requirements of the application. It should also be understood that these units can be arranged in a variety of other configurations. For instance, although shown as separate units in FIG. 3, shear pump 306 and homogenizer 310 can be part of a single unit in other systems. Other combinations that can optionally be utilized in still other systems are those in which cooker 304 and shear pump 306 are part of the same unit, and systems in which cooker 304, shear pump 306 and homogenizer 310 are all part of the same integrated unit.

EXPERIMENTS

Experiment 1

Denatured whey protein powders were made from slurries of whey protein concentrate that was generated as a byproduct of a cheese making process. 110 gallons of a native whey protein concentrate having total solids, by weight, of 29% was run though a mixer/cooker that stirred the heated slurry at about 650 rpm. Samples of the heated whey slurry where transferred from the mixer/cooker at slurry temperatures of 160° F., 170° F., 180° F., 190° F., and 210° F., and sent to a shear pump running at 45 Hz. After the slurry was subjected to the high shear conditions, it was sent to a vacuum vessel and exposed to full vacuum. Wet samples were collected as the slurry was transferred to a dryer to generate the whey protein powder.

Figure 4:
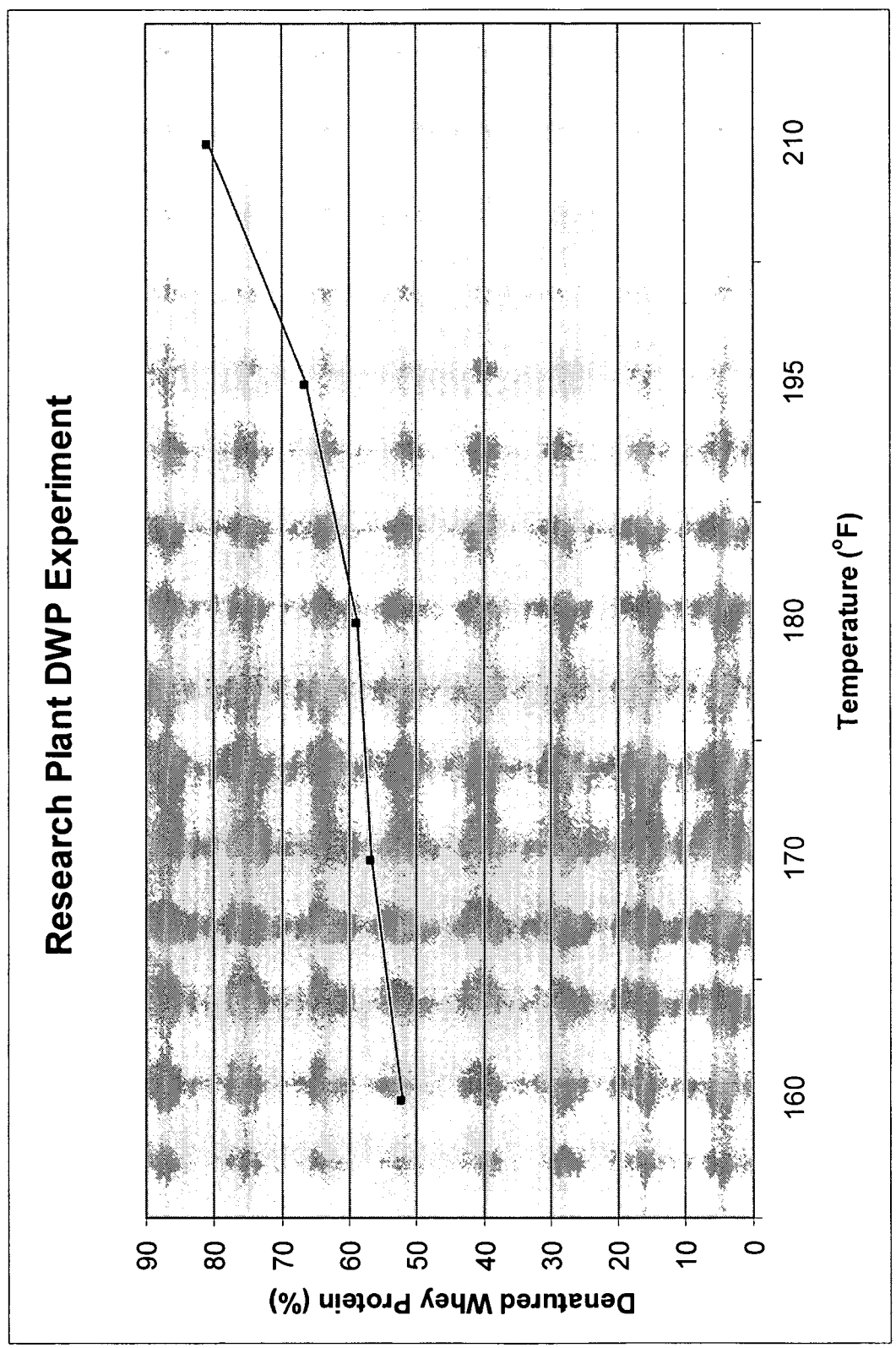
FIG. 4 show a graph of the percentage of denatured whey protein as a function of heating temperature.

FIG. 4 shows the percentages of denatured whey protein (DWP) for dry samples pulled at each slurry temperature. The graph in FIG. 4 shows that a greater percentage of the native whey protein is denatured as the slurry temperature increases.

Experiment 2

In this experiment, the pH of the slurry was raised by the addition of calcium hydroxide $Ca(OH)_2$. 910 pounds of a native whey protein concentrate having total solids, by weight, of 29% (i.e., 264 lbs of solids/646 lbs of water) was prepared by mixing the proper amount of 80% WPC powder with sufficient water. Half a pound of $Ca(OH)_2$ was added to the slurry to a neutral pH (i.e., pH=7.0) as it was transferred to the mixer/cooker and heated to 195° F. The heated product was then sent through the high shear pump and vacuum chamber before being dried to produce the whey protein concentrate powder. The percent of denatured whey protein in this experiment was 71.2%.

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a process" includes a plurality of such processes and reference to "the electrode" includes reference to one or more electrodes and equivalents thereof known to those skilled in the art, and so forth.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, acts, or groups.

What is claimed is:

1. A method of making a powdered whey protein, the method comprising:
    heating a slurry comprising a starting whey protein to a temperature of about 140° F. to about 300° F., wherein the heating converts at least a portion of the starting whey protein to denatured whey protein;
    homogenizing the slurry;
    subjecting the slurry to high shear conditions;
    exposing the slurry to a sub-atmospheric pressure atmosphere; and
    drying the slurry to leave the powdered whey protein.

2. The method of claim 1, wherein the starting whey protein is a native whey protein.

3. The method of claim 1, wherein the slurry is derived from a cheesemaking process.

4. The method of claim 1, wherein the slurry is mixed while being heated.

5. The method of claim 1, wherein the slurry is heated by injecting steam directly into the slurry.

6. The method of claim 1, wherein the slurry is heated by an indirect heat source.

7. The method of claim 1, wherein the slurry is spray dried to form the powdered whey protein.

8. The method of claim 1, wherein the slurry has a whey protein content of about 7%, by weight, or more.

9. The method of claim 1, wherein the slurry has a total dry matter content of about 20%, by weight, or more.

10. The method of claim 1, wherein the slurry has a whey protein content of about 34% or more, by weight, relative to the total dry matter.

11. The method of claim 1, wherein the slurry comprises a pH adjusting agent.

12. The method of claim 11, wherein the pH adjusting agent is calcium hydroxide.

13. The method of claim 1, wherein the temperature is about 195° F.

14. The method of claim 1, wherein the denatured whey protein is an ingredient in a confectionary.

15. The method of claim 14, wherein the confectionary is caramel, protein bar, or meal replacement food.

16. A method of making protein enhanced caramel, the method comprising:
    heating a whey protein slurry to about 140° F. to about 300° F., and subjecting the slurry to high shear conditions, wherein the heating converts at least a portion of native whey protein to a denatured whey protein;
    homogenizing the slurry;
    subjecting the slurry to high shear conditions;
    exposing the slurry to a sub-atmospheric pressure atmosphere;
    drying the slurry to form a whey protein powder; and adding the whey protein powder to other ingredients and forming the protein enhanced caramel.

17. The method of claim 16, wherein the other ingredients are selected from the group consisting of butter, sugar, milk, sweetened condensed milk, partially hydrogenated vegetable oil, vegetable oil, non-fat dry milk, whey salt, soy lecithin, glucose syrup, sweetened condensed skim milk, sorbitol, sugar substitutes, whey powder, cream, cane sugar syrup, flavors, corn syrup, high-fructose corn syrup, milk, disodium phosphate, sodium bicarbonate, artificial flavors, vanilla, skim milk, and starch.

18. The method of claim 16, wherein the protein enhanced caramel is added to a confectionary product.

19. The method of claim 18, wherein the confectionary product is a protein bar.

\* \* \* \* \*